United States Patent [19]

Bardon et al.

[11] Patent Number: 5,772,329
[45] Date of Patent: Jun. 30, 1998

[54] PROCESS AND DEVICE FOR TRANSIENT MEASURING OF SURFACE TEMPERATURES AND HEAT FLUX

[75] Inventors: Jean-Pierre Bardon, Nantes; Yvon Jarny, Orvault, both of France

[73] Assignee: Universite De Nantes, Nantes Cedex, France

[21] Appl. No.: 696,949

[22] PCT Filed: Feb. 21, 1995

[86] PCT No.: PCT/FR95/00202

§ 371 Date: Aug. 22, 1996

§ 102(e) Date: Aug. 22, 1996

[87] PCT Pub. No.: WO95/22746

PCT Pub. Date: Aug. 24, 1995

[30] Foreign Application Priority Data

Feb. 22, 1994 [FR] France ................................. 94 01996

[51] Int. Cl.⁶ ........................... G01K 7/04; G01K 17/00; G01K 3/06
[52] U.S. Cl. ........................... 374/179; 374/166; 374/29; 374/30
[58] Field of Search ................ 374/29, 30, 179, 374/166, 142

[56] References Cited

U.S. PATENT DOCUMENTS

| 3,040,579 | 6/1962 | Taylor | 374/179 |
|---|---|---|---|
| 3,233,458 | 2/1966 | Vrolyk | 374/30 |
| 3,267,726 | 8/1966 | Sellers, Jr. | 374/30 |
| 3,280,626 | 10/1966 | Stempel | 374/30 |
| 3,417,617 | 12/1968 | Rall | 374/166 |
| 4,674,555 | 6/1987 | Plata | 374/179 |
| 4,904,091 | 2/1990 | Ward | 374/179 |
| 5,005,986 | 4/1991 | Najjar et al. | 374/179 |
| 5,048,973 | 9/1991 | Liebert et al. | 374/29 |
| 5,147,137 | 9/1992 | Thiesen | 374/179 |

FOREIGN PATENT DOCUMENTS

| 3 822 164 | 1/1990 | Germany . | |
|---|---|---|---|
| 0001676 | 1/1979 | Japan | 374/179 |
| 0129228 | 8/1983 | Japan | 374/30 |
| 0495551 | 12/1975 | U.S.S.R. | 374/179 |
| 1195110 | 6/1970 | United Kingdom | 374/179 |
| 1297514 | 11/1972 | United Kingdom | 374/30 |

OTHER PUBLICATIONS

M. Raynaud et al., "A New Finite–Difference Method for the Nonlinear Inverse Heat Conduction Problem", *Numerical Heat Transfer*, vol. 9, No. 1, 1986, pp. 27–42.

*Primary Examiner*—Diego F. F. Gutierrez
*Attorney, Agent, or Firm*—Young & Thompson

[57] ABSTRACT

Process and apparatus for transiently measuring surface temperatures and heat flux at the interface of two media, one of which is solid. In a solid wall through which a thermal stream flows, a cut is made which opens into the interface between the wall and the other medium. The cut is parallel to the stream at a point of contact corresponding to the interface. A microthermocouple is arranged in a plane of the cut in the immediate vicinity of the interface. The cut is closely covered by the material of the solid wall or a material with thermal characteristics similar to those of the peripheral material.

9 Claims, 5 Drawing Sheets

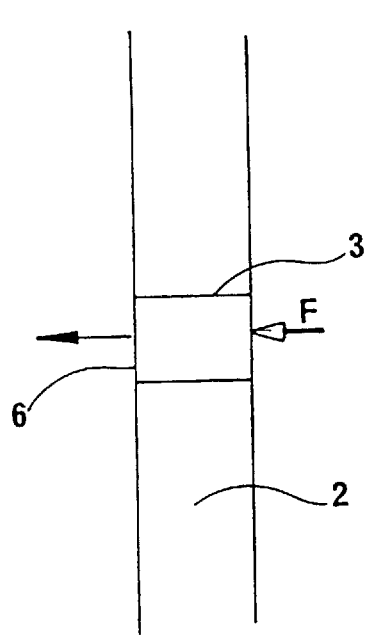
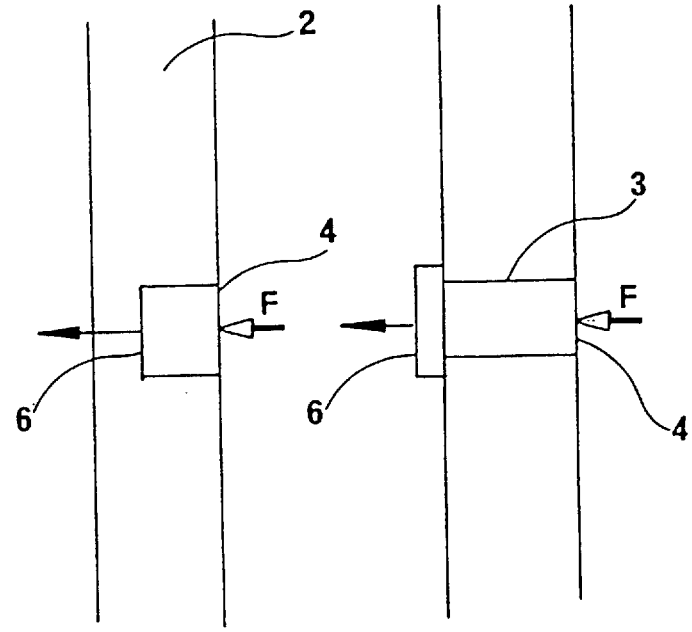
FIG.2A  FIG.2B  FIG.2C

5,772,329

PROCESS AND DEVICE FOR TRANSIENT MEASURING OF SURFACE TEMPERATURES AND HEAT FLUX

FIELD OF THE INVENTION

The present invention relates to the measurement of interfacial flux and temperatures of two media, namely solid/solid or solid/liquid or solid/gas.

BACKGROUND OF THE INVENTION

The direct measurement at the interface is often delicate, even impossible, like that within the internal medium. Generally an evaluation is carried out which is less pertinent as the detector, generally constituted by thermoelectric couples, is implanted in the wall at a relatively great distance from the interface. If rapid changes in the physical phenomenon to be analyzed or to be inspected take place, such an arrangement of the detector leads to gathering only imprecise information, the high frequency components of the measurement being filtered and the latter being moreover delayed relative to the phenomenon. In other cases, the protection which must be provided to bring the detector adjacent the phenomenon disturbs it locally. A large systematic error can be introduced. As flux measurements are often made with the assistance of at least two thermocouples implanted along a same normal isotherm curve, the problems are multiplied.

SUMMARY OF THE INVENTION

The object of the present invention is therefore to provide a process and device for measurement incorporating detectors which modify neither the geometry of the interface nor its contact with the medium and permit the identification of rapid variations of heat flux.

To this end, the invention has for its first object a process for measurement of flux and temperatures at the interface of two media, such as solid/solid or solid/liquid or solid/gas by means of at least one thermocouple, characterized in that there is provided in the solid wall traversed by the heat flux a cut opening onto the interface of said wall with the other medium, said cut being parallel to said flux at the corresponding point of the interface, there is disposed at least one microthermocouple in a plane of said cut immediately adjacent said interface and, in the case of a flux measurement, at least one other microthermocouple in said plane at a predetermined distance from the interfacial microthermocouple and said cut is tightly covered by the material of said solid wall or a material having thermal characteristics similar to those of the wall material.

Thanks to the use of microthermocouples disposed on the cut surface of the solid wall to be measured, it is possible to implant the thermocouple practically at the interface, depending on the dimensions of the thermocouple. The formation of the cut can be effected by cutting the member in two and then reuniting the two parts by any suitable process. It can also comprise the formation of a well with adjusted walls in which is then tightly provided a detector of complementary shape, carrying the thermocouple or thermocouples, and made of a material identical to that of the wall or having similar thermal characteristics.

In this latter case, the invention also has for its object a device for measuring the flux and temperatures at the interface of two media, such as solid/solid or solid/liquid media by means of at least one detector disposed in one of the solid walls, characterized in that said detector, whose body is of a material having thermal characteristics similar to the wall material, is disposed in a manner complementary to the interior of a recess opening onto the interface in which the measurements are taken. The walls of said recess are parallel to the flux at the corresponding point of contact of the interface. The detector has at least one cut plane parallel to the flux to be measured and incorporating in said cut plane at least two microthermocouples electrically insulated from the material of the body of the detector. The microthermocouples have a portion disposed perpendicular to said flux and at least one second portion in prolongation of the first portion connected to a unit for processing the measurements.

There has been proposed (see U.S. Pat. Nos. 5,048,973 and 5,086,204) to provide in the wall material an annular terminal notch in which are mounted thermocouples. Such a known device does not permit, as does the present invention, an implantation of thermocouples in the intermediate vicinity to the interface.

There is also known, for example from DE-A-3.822.164, a technique for implantation of thermocouples in so-called thin layers on the interface or in immediate vicinity to the interface, or else on a connected member of a material having very similar thermal properties. This technique permits the measurement of only surface flux at the interface and moreover disturbs the operation of the device to be measured because of the multiplication of the necessary insulating layers.

BRIEF DESCRIPTION OF THE DRAWINGS

The invention will be understood from a reading of the following description of examples of embodiment, with reference to the accompanying drawings, in which:

FIGS. 2A to 2C show a cross section of the detector implanted within said wall;

DETAILED DESCRIPTION OF THE INVENTION

According to the invention described in the case of using an added detector, the device for measuring surface temperature and flux comprises at least one detector of thermal characteristics similar to those of the wall material implanted within a recess provided in said wall and microthermocouples 8 provided from the circuit of conductive wires ensuring the transmission toward the exterior of the different signals to be processed, a processing unit for data measurement integrated or not with the body of the detector and delivering values of surface temperature and/or flux.

Figure 1:
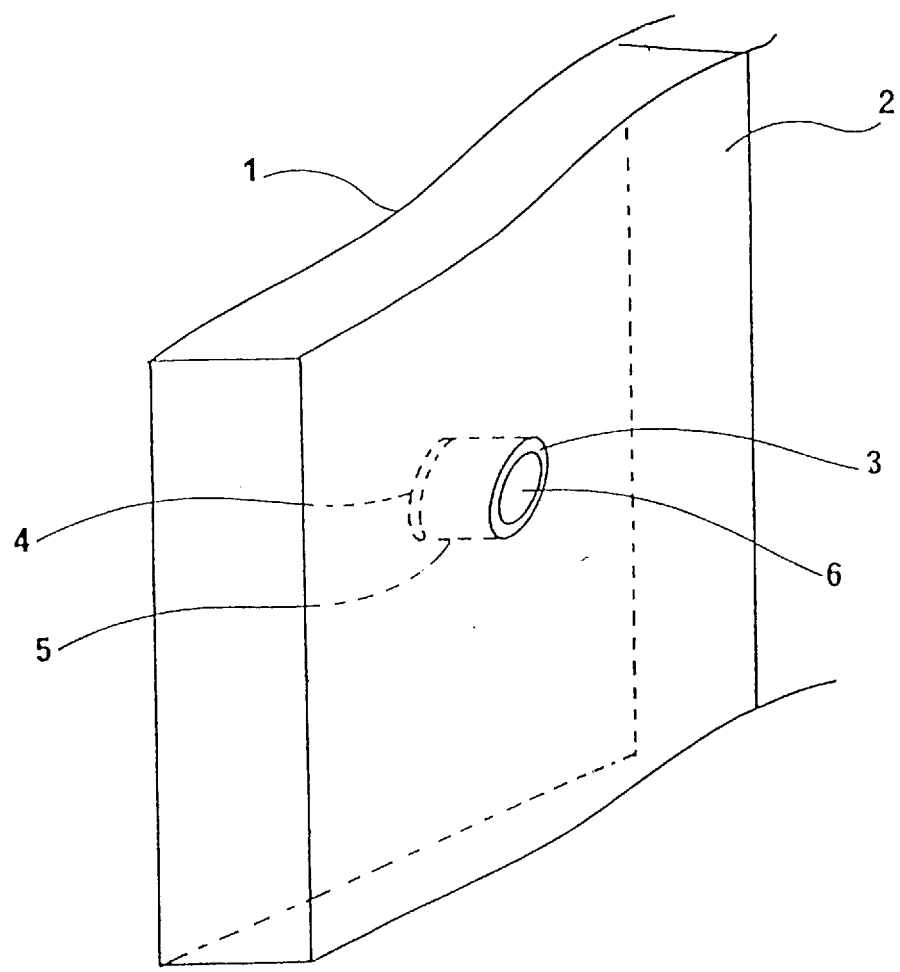
FIG. 1 is a perspective profile view of a wall portion with a detector implanted within said wall.
Figure 4:
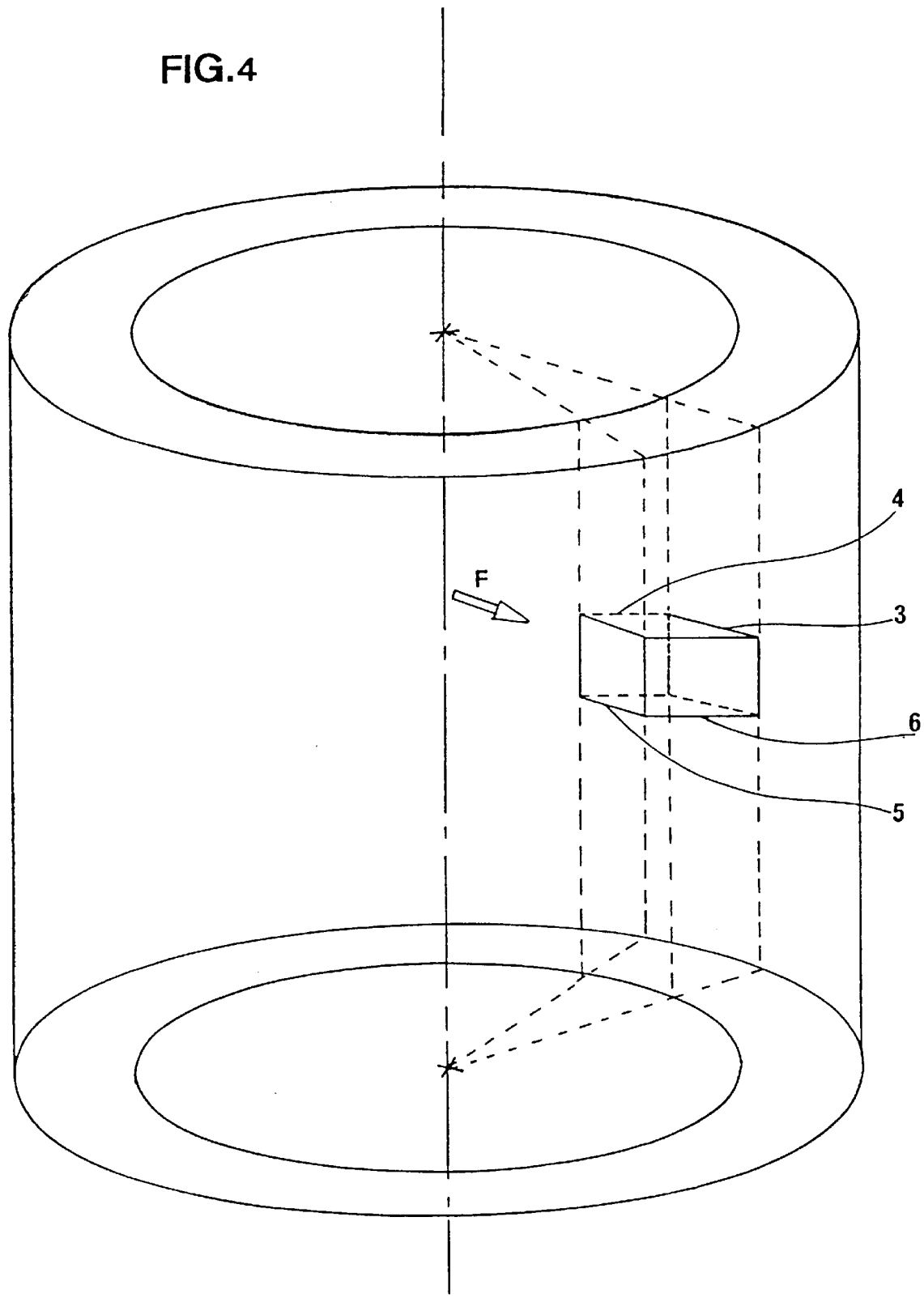
FIG. 4 shows in partial cross-sectional view another embodiment of the detector.
Figure 5:
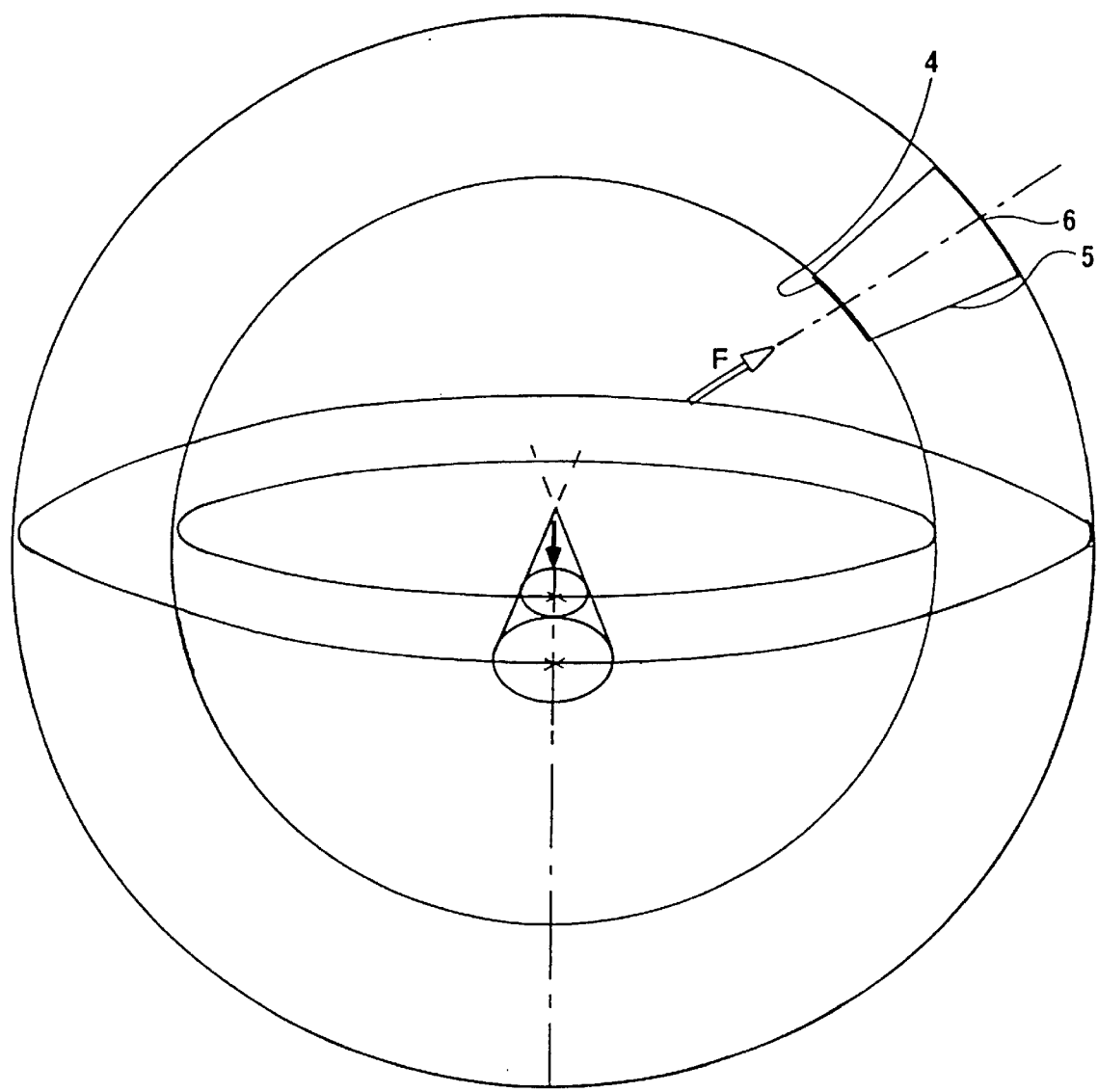
FIG. 5 shows another embodiment of the detector.

This measuring device permits measurement of temperature flux at the interface of the solid/solid or solid/liquid or solid/gas media. The detector or detectors are still implanted within the solid wall. In the case of FIG. 1, the interface shown at 1 constitutes the interface of a solid/solid medium, the solid medium being constituted by the wall 2. The detector 3 is incorporated in a recess provided in this wall. The detector 3, independent of its shape, will always comprise a front surface 4 opening at the interface 1, one or more lateral walls 5 and a rear face 6. The front face, the lateral wall or walls and the rear face delimit the volume of the body of the detector. This volume of the body of the detector corresponds substantially to the volume of the recess. The front face is a portion of the interface of sufficiently limited dimensions such that it can be considered as an isothermal surface element. This front face will have, in most cases, for practical reasons, a center of symmetry. This center will be defined also as the intersection of the axis of the body of the detector and its front face. This detector moreover comprises one or several side walls 5. This side wall is defined as a controlled surface whose generatrix normal to the isotherm surface describes the contour of the front face. In the simplest case, shown in FIG. 1, in which the heat transfer can be described suitably in the region of the detector as unidirectional, this side wall is a cylinder defined by a straight line perpendicular to the isothermal surfaces describing the contour limiting the front face of the detector. In the case shown in FIG. 4, in which the heat transfer phenomenon has a so-called cylindrical symmetry, the side wall 5 will be constituted of four planes of which two pass through the axis of symmetry of the cylinder and the other two are perpendicular to this axis. In other words, the detector will be constituted by a cylindrical sector. In the case in which, as shown in FIG. 5, the phenomenon of heat transfer has a spherical symmetry, the side wall will be delimited by a truncated cone or a cone whose apex is the center of the sphere. As to the rear face 6, it is defined as a portion of the isotherm limited by a contour which is the trace of the side wall 5 on this surface. This rear face can have as its shape a variable configuration such as represented in FIGS. 2A to 2C. In FIG. 2A, this rear face of the body of the detector constitutes a portion of the rear face of the wall 2. In the case of FIG. 2B, this rear face 6 of the body of the detector is integrated in the interior of the wall 2. In this case, the contact between the rear face of the body of the detector and the rest of the wall will be such that the thermal resistance of contact along this surface will be reduced as possible. Finally, in the case of FIGS. 2C, this rear face 6 of the body of the detector projects beyond the rear face of the wall 2.

Figure 3:
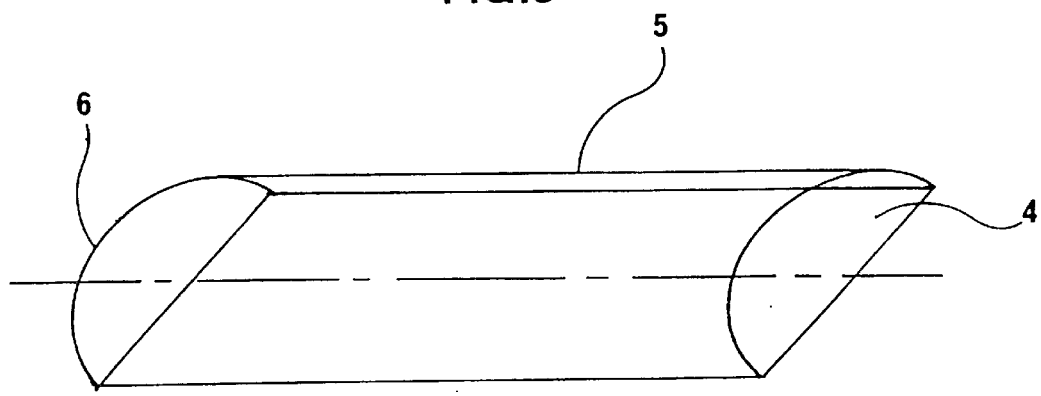
FIG. 3 shows an exploded view of the cutting plane of a detector provided with thermocouples.
Figure 3:
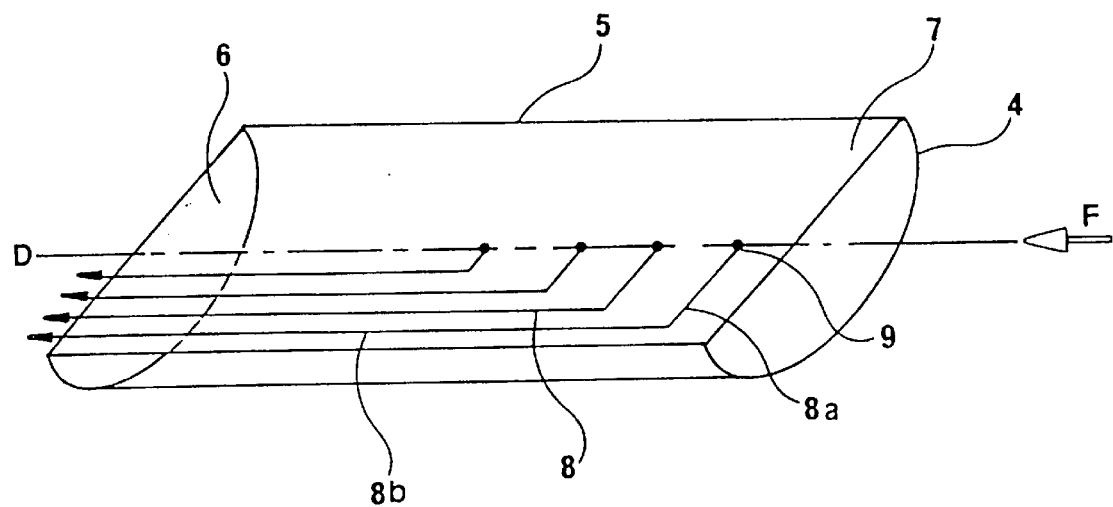

This detector, whose geometry will be described, has at least one cutting plane 7 as shown in FIG. 3. The microthermocouples 8 are disposed in this cutting plane or planes 7. These thermoelectric couples 8 are generally of the intrinsic type if the material of the wall of the detector is conductive or more rarely of conventional type with two wires when the constituent material of the wall is not conductive. The section of the conductors and of the constituents is very small, of the order of 100 to 300 microns$^2$. The junctions 9 of each of the implanted thermoelectric couples are provided at points located on an axis parallel to the flux F. This axis will correspond generally to the so-called axis of symmetry of the body of the detector defined above. It is important that immediately adjacent the junction, the conductive wire, constituting a thermoelectric couple, is directed perpendicular to the thermal flux along a length at least equal to for example 20 times its mean diameter. This portion corresponds to the portion 8a shown in FIG. 3. The path of the conductor is such that the conductor opens into the rear face 6 of the body of the detector to be connected to the processing module for the measurement signals. This second portion corresponds to the portion 8b shown in FIG. 3. The conductors constituting the thermoelectric couples which are intrinsic or not must be isolated from each other. This is why, during the process of production of said detectors, there are used insulating layers on the planar separation surfaces or cutting planes 7 of the elements of the bodies of the detector by any means adapted for the purpose when that is necessary. Moreover, the path of the wires of the different microthermocouples must be such that the wires do not cross. The minimum number of thermoelectric couples 8 implanted in the body of the detector is two. These microthermocouples are implanted at abscissae comprised between $x_{min}$ and $x_{max}$ measured along the axis of the detector from a point of origin situated at the point of intersection with the front face of said detector. Once the implantation of the microthermocouples has been effected, the detector is reconstituted and installed in the recess provided for this purpose. It is to be noted that the implantation of the microthermocouples 8 can take place by gluing under microscopic observation, by the deposit through a mask, by vacuum deposition of a thin layer and by lithography of this latter or by transfer from an adhesive film of very small thickness. The immobilization, in particular, in translation of the detector within the recess can be effected by means of pins of a thermoconductivity identical to that of the wall.

By way of example, the positioning of the microthermocouple or microthermocouples in the interval $x_{min}$, $x_{max}$ of a detector of surface temperature and flux is described hereinafter.

There will be considered the case in which the signal to be reconstituted is the superposition of a slow signal and a rapid signal. The impulse response with a condition on the temperature, more constraining than with a condition on the flux, is studied as a function of the position $x_c$ of the junction and of the diffusivity A of the material. The analysis of this response associated with that of the uncertainty $\epsilon_y$ on the position and to that of the uncertainty $\epsilon_y$ on the response leads to a choice of $x_{min}$ and of $x_{max}$ corresponding to the rapid component of the signal. Thus, in the case in which a corresponds to diffusivity, h to the impulse response and $x=x_c$, t to time, y to the response in $x_c$, $\theta(x,t)$ to the temperature at the abscissa x, to the instant t, $\Delta x$ to the uncertainty in the position of the junctions, $\Delta y$ to the uncertainty of the response considering the phenomenon of thermoconduction as flowing in a semi-infinite medium of diffusivity a, the temperature $\theta$ to the abscissa x, to the instant t is the solution of the system of equations:

$$\frac{\partial \theta}{\partial t}(x,t) = a \frac{\partial^2 \theta}{\partial x^2}(x,t), x > 0, t > 0$$

$$\theta(x, t) = u(t), x = 0, t > 0$$

$$\theta(x, t) = 0, x > 0, t = 0$$

in which u(t) is any excitation variable as a function of time.

Thus T(x,t) the response to the unitary impulse $\delta(t)$ $$\frac{\partial T}{\partial t}(x,t) = a \frac{\partial^2 T}{\partial x^2}(x,t), x > 0, t > 0$$

$$T(x, t) = \delta(t), x = 0, t > 0$$

$$T(x, t) = 0, x > 0, t = 0$$

The solution $\theta(x,t)$ is obtained by convolution of u(t) with T(x,t)

$$\theta(x, t) = \int_c^\tau u(t - \tau) T(x, \tau) d\tau$$

The impulse response T(x,t) when $x=x_c$, is noted h(t) equals:

$$h(t) = \frac{x_c}{\sqrt{4\pi a}} \, t^{-3/2} \exp\left(-\frac{x_c^2}{4at}\right), \, t > 0$$

An approximation of the impulse δ(t) is obtained by considering the unitary "gap" function c(t), of a width Δt and of an amplitude 1/Δt.

By deriving for t, there is obtained $$h'(t) = \frac{x_c}{\sqrt{4\pi a}} \, t^{-3/2} \exp\left(-\frac{x_c^2}{4at}\right) \left[-\frac{3}{2t} + \frac{x_c^2}{4at^2}\right]$$

in which h(t) is a maximum for $$\boxed{t^* = \frac{x_c^2}{6a}}$$

and $$h_{max} = h(t^*) = \frac{x_c}{\sqrt{4\pi a}} \left[\frac{x_c^2}{6a}\right]^{-3/2} \exp(-3/2)$$

or $$C = 6\,[3/2\pi]^{1/2} \exp(-3/2) = 0.925$$

becomes $\boxed{h_{max} = C \frac{a}{x_c^2}}$

Response to any entry:

The convolution of the entry u(t) and of the response h(t) is denoted y(t), and permits obtaining numerically the response to any entry.

It is noted that $t_k = k\,\Delta t$, $u_k = u(t_k)$ and $y_k = y(t_k)$

Taking a "rectangular" approximation of the integral of convolution, there is obtained:

$$y_k \cong \frac{x_c}{\sqrt{4\pi a \Delta t}} \sum_{j=1}^{k} u_{k-j} \exp\left(-\frac{x_c^2}{4aj\Delta t}\right) j^{-3/2}$$

Example 1: $u(t_k) = 1/\Delta t, 0, 0, \ldots$ ;=unitary "gap" function $$y_k \cong \frac{x_c}{\sqrt{4\pi a}} \exp\left(-\frac{x_c^2}{4at_k}\right) (t_k)^{-3/2} = h_k$$

Note: if $\Delta t \ll t^*$, h(t) is an approximation of the response y(t)

Example 2: $u(t_k) = \theta_o, 0, 0, \ldots$ = a "gap" function of amplitude $\theta_o$, of a duration Δt $y_k \approx \theta_o \, h_k \, \Delta t$ Determination of $x_{max}$ The determination of $x_{max}$ can be decided by observing on the one hand that the amplitude $h_{max}$, hence the sensitivity of the detector, decreases when the position $x_c$ is spaced from x=0, and that the other portion of the period t*, and hence the response time of the detector, increases, when $x_c$ increases.

specification of the "signal/noise" ratio

Let y be the response to the "gap" function of amplitude $\theta_0$ and of duration Δt, (Δt<<t*). It will be considered that the noise level Δy at this response and εy will designate the uncertainty Δ y/θ₀, giving:

$y_{max} \cong \theta_0 \, h_{max} \, \Delta t$ there is introduced a minimum "signal/noise" ratio $R_{min}$, $x_c$ will be chosen such that $$\frac{y_{max}}{\Delta y} > R_{min}$$

To give values to the variables, it is useful to introduce a reference length $$x_r = \sqrt{a\Delta t}$$

and the reduced variable $\zeta = x_c/x_r$, such that $y_{max} = C\theta_0/\zeta^2$ and the preceding condition becomes $\dfrac{C\theta_0}{\Delta y R_{min}} = \dfrac{C}{\epsilon_y R_{min}} > \xi^2$ given that $$\xi_{max}^2 = \frac{C}{\epsilon_y R_{min}},$$

it will be true that $\zeta < \zeta_{max}$ therefore $x_c < x_{max}$ $R_{min}=1$ corresponds to the threshold of detectability.

Example: $R_{min}=1$, $a=10^{-5} m^2/s$, $\epsilon_y \cong 10^{-3}$, $\Delta t=10^{-4}s$, $C \cong 1 => x_{max}=10^{-3}$ m To detect a "pulse" of 100 μs, if the precision of measurement is $10^{31\,3}$, with $a=10^{-5}$, the maximum position is $x_{max}=1$ mm.

Specification of response time:

The period t* is an approximation of the time necessary for the input "slot" to be "seen" by the detector located at $x_c$. Introducing $\tau_{max}$, maximum time constant of the detector, $x_c$ will be selected such that:

$$t^* < \tau_{max}, q \cdot e \cdot d \cdot \frac{x_c^2}{6a} < \tau_{max}$$

from which, given that $$\boxed{x_{max}^2 = 6\,a\,\tau_{max}}$$

we get $x_c < x_{max}$

Example: $a=10^{-5} m^2/s$, $\tau_{max}=10^{-2}s => x_{max}=7.75$ mm

Note: the time constant $\tau_{max}$ must be brought close to the sampling frequency N of the signal.

Determination of $x_{min}$:

As shown by the preceding result, the signal source must be reconstituted from an observation taken at an abscissa as near as possible to the wall. However, when the junction of the thermocouples nears the wall, the uncertainty relative to its position increases as well as the error engendered by the reconstruction of the signal. Taking into account the uncertainty on temperature measurement and that on the emplacement of the junction, therefore leads to defining a position called $x_{min}$ between the abscissae x=0 and $x_{max}$.

Considering again the response y(t) to the "slot" function of amplitude $\theta_0$ and the duration Δt, (Δt<<t*)

We have $y(t) \cong \theta_0 \, \Delta t \cdot h(t)$, t>0

To determine $\theta_0$ from y, we will consider the instant t* at which the sensitivity is maximum:

$$y(t^*) \simeq \theta_0 \Delta t \cdot h_{max} => y_{max} \simeq \theta_0 \frac{Ca\Delta t}{x_c^2}$$

in which $\frac{dy}{y_{max}} = \frac{d\theta_o}{\theta_o} - 2\frac{dx_c}{x_c}$ $$\frac{d\theta_o}{\theta_o} = \frac{dy}{y_{max}} + 2\frac{dx_c}{x_c}$$

as $\frac{dy}{y_{max}} = \frac{dy}{\theta_o} \frac{x_c^2}{Ca\Delta t}$ there is derived $\frac{\Delta\theta_o}{\theta_o} \leq \frac{x_c^2}{Ca\Delta t} \frac{\Delta y}{\theta_o} + 2\frac{x_{max}}{x_c} \frac{\Delta x_c}{x_{max}}$ $\frac{\Delta\theta_o}{\theta_o} \leq \frac{x_c^2}{Ca\Delta t} \epsilon_y + 2\frac{x_{max}}{x_c} \epsilon_x = \phi(x_c; \epsilon_y; \epsilon_x)$ We introduce $\epsilon_0$, a desired relative uncertainty, into $\theta_0$, To get:

$$\frac{\Delta\theta_0}{\theta_0} \leq \epsilon_0$$

It suffices that $x_c \epsilon )0, x_{max}$ (verifies:

$\phi(x_c; \epsilon_y, \epsilon_x) < \epsilon_0$

We take as $x_{min}$, the lower value of $x_c$ which verifies this inequality. The higher $\epsilon_0$ the weaker will be $x_{min}$.

There exists an optimum value $x_c^*$ which minimizes the uncertainty $\phi$.

We find that $x_c^* = (\Delta x \, Ca \, \Delta t/\epsilon t)^{1/3}$

Example: $\Delta x = 10 \, \mu m$, $\Delta t = 100 \, \mu s$, $\epsilon y = 10^{-3}$ $a = 10^{-5} m^2/s$ and $xc^* = 214 \, \mu m$ Obviously, it is also possible to implant the thermoelectric couple or couples outside the range $x_{min}$, $x_{max}$. From an emplacement located beyond $x_{max}$, a low frequency component of the signal could be reconstituted. As a result, it is possible to construct a detector of surface flux and temperature comprising a variable number of thermoelectric couples whose implantation will be a function of the dynamic characteristics desired for measurement. The processing of the signals and of the information can be variable. Generally, the signals from each of the thermoelectric couples will be simultaneously sampled and digitized by means of at least one analog-digital converter, at a frequency defined having account for the value of the time constant $t_{max}$ defined above. The data representing the measured temperatures at the different junctions at the instant t will be processed by a microprocessor directly integrated with the detector if it is desired that the estimate of the surface flux and/or temperatures be simultaneous with the measurements or after intermediate recordation by a microcomputer or a workstation if it is accepted that the estimate of surface flux and/or temperatures be delayed relative to the measurements.

By way of example, there is given hereafter a sequential processing algorithm for temperature readings. This data processing has for its object to obtain an approximation of the surface temperature and/or flux as a function of time from periodic internal temperature readings delivered by the microprocessor.

This process is based on the principle of the method of J. V. BECK, which uses an approximation by finite differences of the equation of conduction and the concepts of specification of operation and of future time interval. It is applicable to the case in which at least two microthermocouples are installed.

The general algorithm to determine the surface flux can be given in the following fashion.

let $T_i^k$ be the temperature at instant $t_k$, at the abscissa $x_i$, and $q^k$ the flux at the wall, $x=0$.

at instant $t_M$, there is supposed as known:

the measurement $Y_j^{M+1}$, $1=1$ to $r$, $j=1$ to $j$ in which $r$ = the number of future temperature intervals $J$ = the number of detectors $q^M$ the flux at $x=0$ the temperature range $T_i^M$, $i=0$ to $N$ the flux $q^{M+1}$ to be determined at instant $t_{M+1}$, is obtained by the following general relationship:

$$q^{M+1} = q^M + \sum_{l=1}^{r} \sum_{j=1}^{J} K_j^l [Y_j^{M+l} - V_j^{M+l}]$$

in which $K_j^1$ = the gain coefficient calculated from sensitivity coefficients, and $V_j^{M+1}$ the temperature calculated at the emplacement of measurement number j, by solving the equation for conduction over the time interval $(t_M, t_{M+r})$.

The choice of the number r of future time steps is an essential parameter of the method to ensure the stability of the algorithm. Suitable conditions to select r as a function of the time interval $\Delta t$ and of the amplitude $\epsilon$ of the noise on the measurements Y are given by J. J. REINHARDT (2). The computation of the coefficients $K_j^1$ given in (1). There is described hereinafter the principle of this computation.

Computation of the coefficients $K_j^1$ let $\theta$ be the solution of the direct problem:

$$\begin{aligned}
\theta_t - \theta_{xx} &= 0, & 0 < x < 1, & \quad t > t_M \\
-\theta_x(x=0, t) &= q, & & \quad t > t_M \\
\theta(x=1, t) &= Y_{J+1}(t), & & \quad t > t_M \\
\theta(x, t_M) &= T^M(x), & 0 < x < 1 &
\end{aligned}$$

whatever may be the constant q, to evaluate the difference between the calculated temperature $\theta(x_i, t_{M+1}; q)$ to the measurement $Y_i^{M+1}$, there is introduced the criterion $Z(q)$:

$$Z(q) = \sum_{i=1}^{J} \sum_{l=1}^{r} |\theta(x_i, t_{M+l}; q) - Y_i^{M+l}|^2$$

The optimum value of q which minimizes $Z(q)$ denoted $q^*$, satisfies the relationship:

$$Z'(q^*) = \overline{O}$$

which is to say that $$\sum_{i=1}^{J} \sum_{l=1}^{r} (\theta(x_i, t_{M+l}; q^*) - Y_i^{M+l}) \frac{\partial \theta}{\partial q}(x_i, t_{M+l}; q^*) = 0$$

To obtain the solution $q^*$, the solution $\tilde{O}$ of the direct problem is expressed in the form of a sum:

$\theta = v + w$ with v and w satisfying:

$$v_t - v_{xx} = 0, \quad 0 < x < 1, \quad t > t_M$$
$$-v_x(x = 0, t) = q - q^\#, \quad t > t_M$$
$$v(x = 1, t) = 0, \quad t > t_M$$
$$v(x, t_M) = 0, \quad 0 < x < 1$$
$$w_t - w_{xx} = 0, \quad 0 < x < 1, \quad t > t_M$$
$$-w_x(x = 0, t) = q^\#, \quad t > t_M$$
$$w(x = 1, t) = Y_{J+1}(t), \quad t > t_M$$
$$w(x, t_M) = T^M(x), \quad 0 < x < 1$$

In which q# is any constant, if desired zero.

The derivative $\delta\theta/\delta q$, denoted S is the solution of the sensitivity equations:

$$S_t - S_{xx} = 0, \quad 0 < x < 1, \quad t > t_M$$
$$-S_x(x = 0, t) = 1, \quad t > t_M$$
$$S(x = 1, t) = 0, \quad t > t_M$$
$$S(x, t_M) = 0, \quad 0 < x < 1$$

It will be seen that $v(x_1, t_{M+1}) = (q-q\#)S(x_i, t_1)$ given that $\Delta q = (q-q\#)$ and $S_i^{l=(x}{}_i, t_i)$, there is obtained $$\theta(x_i, t_{M+l}; q) = \Delta q \, S_i^l + w(x_i, t_{M+l})$$

$$Z'(q) = \sum_{i=1}^{J} \sum_{l=1}^{r} (\Delta q \, S_i^l + w(x_i, t_{M+l}) - Y_i^{M+l})S_i^l$$

from which the solution q* verifies:

$$\sum_{i=1}^{J} \sum_{l=1}^{r} (\Delta q^* S_i^l + w(x_i, t_{M+l}) - Y_i^{M+l})S_i^l = 0$$

$$\Delta q^* \sum_{i=1}^{J} \sum_{l=1}^{r} (S_i^l)^2 = -\sum_{i=1}^{J} \sum_{l=1}^{r} (w(x_i, t_{M+l}) - Y_i^{M+l}) S_i^l$$

$$q^* = q^\# + \sum_{i=1}^{J} \sum_{l=1}^{r} (Y_i^{M+l} - w(x_i, t_{M+1}))K_i^l$$

and the coefficients $k_i^1$ are defined by $$K_i^l = \frac{S_i^l}{\sum_{i=1}^{J} \sum_{l=1}^{r} (S_i^l)^2}$$

These coefficients can be determined offline.

We claim:

1. Process for measuring interfacial flux and temperatures of two media, one of which is solid, said two media being selected from the group consisting of solid/solid, solid/liquid, and solid/gas, the process comprising:

providing in a solid wall member made of a material and traversed by the flux, a cut which opens onto the interface of said wall member with the other medium, and which has a longitudinal axis parallel to said flux, by forming a recess opening onto the interface;

providing a detector, and dividing said detector in two portions in at least one cutting plane parallel to the flux so as to obtain an exposed face;

positioning on at least one portion of the exposed face of said cutting plane an insulation;

implanting at least a first microthermocouple in the cutting plane immediately adjacent said interface;

implanting at least one other microthermocouple in said cutting plane at a predetermined distance from the first microthermocouple; said microthermocouples being implanted in said cutting plane along a direction normal to said flux by removing the insulation at a junction point of the microthermocouples with the axis of the cutting plane;

assembling said portions of the detector;

positioning the detector in said recess opening where measurements are to be taken, said recess being of a volume substantially identical to that of the detector such that the detector is immobilized within the recess and perfect continuity is ensured between the detector and the wall member; and covering said cut tightly with the material of said solid wall member or a material having thermal characteristics similar to those of the wall material.

2. Process according to claim 1, wherein the cut is made by cutting the wall member in two parts, then reuniting the two parts.

3. Process according to claim 1, wherein the detector is made of a material identical to that of the wall member, or has similar thermal characteristics.

4. Process according to claim 1, wherein the microthermocouples are implanted in said cutting plane under microscopic observation.

5. Process according to claim 1, wherein said microthermocouples are implanted in said cutting plane by deposition through a mask.

6. Process according to claim 1, wherein said microthermocouples are made by vacuum deposition of a thin layer and by photolithography of said thin layer.

7. Process according to claim 1, wherein said microthermocouples are implanted by transfer from an adhesive film of small thickness.

8. Process according to claim 1, wherein said microthermocouples are connected to a data processing unit.

9. Process according to claim 8, wherein the data processing unit comprises at least one analog to digital converter, a system with a microprocessor, and a specific software.

* * * * *